United States Patent Office 3,316,332
Patented Apr. 25, 1967

3,316,332
SULFOXY ALKYL PHOSPHONO COMPOUNDS
George M. Calhoun, Cleveland, Ohio, and Hyman Diamond, Sacramento, Calif., assignors to Shell Oil Company, New York, N.Y., a corporation of Delaware
No Drawing. Original application Dec. 23, 1960, Ser. No. 77,830, now Patent No. 3,112,269, dated Nov. 26, 1963. Divided and this application Sept. 30, 1963, Ser. No. 312,329
10 Claims. (Cl. 260—948)

This application is a division of patent application Serial No. 77,830 which was filed December 23, 1960, and is now Patent No. 3,112,269.

This invention relates to a new and novel class of organic sulfoxy alkyl phosphono compounds. More particularly, the invention is directed to oil-soluble sulfoxy alkyl phosphono compounds for use in fuels and lubricants.

The invention is directed to a new and novel class of sulfoxy alkyl phosphono compounds having the general formula:

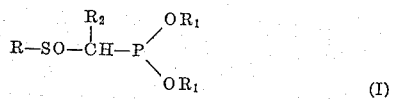

(I)

wherein R is an oil-soluble hydrocarbyl group, such as an alkyl, aryl, aralkyl, alkaryl or cycloalkyl radical having at least 2 and preferably being an alkyl radical having from 6 to 18 carbon atoms, $R_2$ is a $C_{1-4}$ alkyl radical or hydrogen, the $R_1$'s are the same or different groups selected from hydrogen, hydrocarbyl, or cationic groups, such as a metallic or non-metallic cationic group, such as mono- or poly-valent metal or amine, preferably alkylamine. Preferred compounds of the general formula (I) have the following formula:

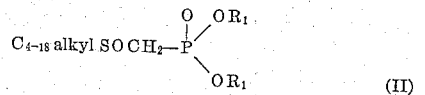

(II)

The sulfoxyphosphono compounds are prepared by reacting an organic mercaptan having at least 2 carbon atoms such as butyl, hexyl, octyl, decyl, dodecyl, octadecyl, phenyldecyl, benzyl mercaptans and the like with a halomethylphosphono compound such as chloromethylphosphonic acid or its ester or salt derivative in a suitable solvent, such as an aqueous alcoholic solution, at reflux temperature and under inert conditions until the reaction is completed which normally may require up to about 5 days, and thereafter treating the 2-thiaalkylphosphono compound thus formed with an inorganic acid and an aqueous solution of hydrogen peroxide or with a percarboxylic acid at between 0° and 100° C., preferably at ambient temperature to form the final sulfoxyphosphono compound represented by the above formulas (I) and (II).

The following examples illustrate the preparation of the intermediate product used in forming the final additive by treatment with hydrogen peroxide or percarboxylic acids as described above.

INTERMEDIATE COMPOUNDS

Example I

Stoichiometric amounts of the potassium salt of decyl mercaptan and of monochloromethylphosphonic acid were dispersed in an aqueous solution of ethyl alcohol and the mixture was refluxed at 78° C. under a nitrogen atmosphere for about 1 day. The potassium decylmercaptomethylphosphonate was then treated with strong hydrochloric acid to spring the free phosphonic acid which was recovered by extraction with ether. The final product, decylmercaptomethylphosphonic acid, analyzed as follows:

| | Percent | | | | Equiv. Wt. 1st Hydrogen | Equiv. Wt. Both Hydrogens |
|---|---|---|---|---|---|---|
| | C | H | S | P | | |
| Found | 49.1 | 9.4 | 12.0 | 11.2 | 261 | 132 |
| Expected | 49.1 | 9.4 | 11.94 | 11.54 | 268.3 | 134.1 |

Example II

The procedure of Example I was followed except the potassium salt of phenylmercaptan was used instead of potassium salt of decylmercaptan and the final product was phenylmercaptomethylphosphonic acid.

Example III

The dibutyl ester of decylmercaptomethylphosphonic acid of Example I was prepared by starting with dibutyl chloromethylphosphonate rather than the salt of the free acid.

Example IV

Di-2-ethylhexylamine salt of decylmercaptomethylphosphonic acid (2-thiadodecylphosphonic acid) was prepared by reacting the product of Example I with di-2-ethylhexylamine in an amount sufficient to completely neutralize the strong acid (i.e., first hydrogen).

Example V

By the procedure of Example IV, the tert-octadecylamine salt of decylmercaptomethylphosphonic acid was prepared using tert-octadecylamine, available commercially under the trade name of Primene JM–T, instead of di-2-ethylhexylamine.

The following are additional intermediate compounds:

octylmercaptomethylphosphonic acid,
dodecylmercaptomethylphosphonic acid,
cyclohexylmercaptomethylphosphonic acid,
benzylmercaptomethylphosphonic acid,
phenylmercaptomethylphosphonic acid,
dibutyl decylmercaptomethylphosphonate,
phenyldecylmercaptomethyl acid phosphonate,
dibutyl phenylmercaptomethylphosphonate,
octylamine dodecylmercaptomethylphosphonate,
octadecylamine phenylmercaptomethylphosphonate,
tert-octadecylamine dodecylmercaptomethylphosphonate
and mixtures thereof.

The final compounds of the present invention are prepared by treating the above-described intermediate 2-thiaalkylphosphono compounds with an inorganic acid and an aqueous solution of hydrogen peroxide or with a per(carboxylic) acid at between 0° and 100° C., preferably at ambient temperature, to form the sulfoxymethylphosphono compound.

The aqueous solutions of hydrogen peroxide which may be used include those normally available in commercial quantities, for example, 100 volume percent hydrogen peroxide solution which contains about 30% by weight of hydrogen peroxide ($H_2O_2$). Aqueous solutions of hydrogen peroxide containing concentrations of hydrogen peroxide between 5 and 95% $H_2O_2$ by weight may be used to carry out the treatment. Hydrogen peroxide solutions containing between 25 to 85% by weight $H_2O_2$ are usually used and preferably solutions containing between 30 and 50% by weight $H_2O_2$.

Inorganic acids have been found suitable for use according to the process of the present invention, such as hydrochloric, sulfuric and phosphoric acid, and these acids are conveniently used in the strengths in which they are normally available in commercial quantities. The concentrations of the aqueous solutions of inorganic acid suitable for use with the particular acid being used. Acids in relatively high concentrations are usually preferred but has been found that dilute aqueous solutions containing up to 50% by weight of the acid are also suitable.

Suitable organic peracids which may be used according to the present invention are the peracids of the lower fatty acids, such as performic acid, peracetic acid, perpropionic acid and perbutyric acid, the peracids of the substituted lower fatty acids, such as monochloroperacetic acid and trichloroperacetic acid, and the peracids of the aromatic carboxylic acids, such as perbenzoic acid. Of these, performic acid, peracetic acid and trichloroperacetic acid are the most effective and therefore preferred.

The peracids may be used in the present process either as such or in statu nascendi. Thus, instead of treating the 2-thiamethylphosphono compound with a preformed organic peracid, the mercaptomethylphosphono compound as defined may be treated with a mixture of the organic acid and hydrogen peroxide; these reagents may be used in stoichiometric proportions but generally it is preferable to employ an excess of the acid.

The treatment of the mercaptomethylphosphono compound with hydrogen peroxide solutions or with a peracid is generally effected at ambient temperature, although any other convenient temperature, e.g., between 0° and 100° C., may be employed. The 2-thiaphosphono compound and the oxidizing agents, e.g., aqueous hydrogen peroxide solution or a peracid should be well agitated to ensure intimate contact and, with good agitation, the reaction should be completed in a period of from 30 to 120 minutes.

A convenient method of effecting the treatment is to mix a mercapto-methylphosphono compound with the necessary proportion of aqueous solution of hydrogen peroxide and with the organic acid. The hydrogen peroxide solution is conveniently used in the form in which it is readily available commercially, for example as "100-volume" hydrogen peroxide which contains 30% by weight of hydrogen peroxide. Similarly, the organic acid is conveniently used in the form in which it is available commercially. Thus, formic acid may be used as the commercial acid containing 90% by volume of HCOOH, whereas acetic acid can be used as glacial acetic acid. More dilute aqueous solutions of formic acid may be used, such as those containing 20 to 50% by volume of HCOOH. In the case of solid organic acids such as trichloroacetic acid, these may be dissolved in a suitable solvent such as water or a low-boiling alcohol before adding to the 2-thiamethylphosphono compound and hydrogen peroxide solution, or they may be dissolved or dispersed in the hydrogen peroxide solution before mixing and reacting the constituents.

The following examples illustrate the preparation of the final additives (sulfoxides) of this invention.

FINAL PRODUCT

Example IA

About one mole of the additive of Example I (decyl mercaptomethylphosphonic acid) was mixed with an equivalent amount of hydrogen peroxide-acetic acid solution and the mixture was stirred for 24 hours at room temperature. The sulfoxide product, namely, decylsulfoxymethylphosphonic acid, was recovered by extraction with ether and had the following formula:

$$C_{10}SOCH_2-\overset{O}{\underset{|}{P}}(OH)_2$$

Example IIA

The procedure of Example IA was followed using monobutyl ester of decylmercaptomethylphosphonic acid and the final product formed was monobutyl decylsulfoxymethylphosphonate having the formula

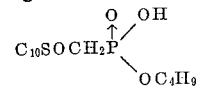

Example IIIA

Dibutyl ester of decylmercaptomethylphosphonic acid was treated with peracetic acid solution for 24 hours at room temperature and recovered by ether extraction. The product was dibutyl decylsulfoxymethylphosphonate

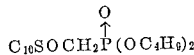

The following are additional final products (sulfoxides) of this invention: octylsulfoxymethylphosphonic acid, dodecylsulfoxymethylphosphonic acid, cyclohexylsulfoxymethylphosphonic acid, benzylsulfoxymethylphosphonic acid, phenylsulfoxymethylphosphonic acid, dibutyl decylsulfoxymethylphosphonate, phenyldecylsulfoxymethyl acid phosphonate, dibutyl phenylsulfoxymethylphosphonate, dioctylamine dodecylsulfoxymethylphosphonate, dioctadecylamine phenylsulfoxymethylphosphonate, tert-octadecylamine dodecylsulfoxymethylphosphonate, and mixtures thereof.

When the sulfoxyalkylphosphono compounds are used as additives for improving oil compositions they are particularly useful when alkylated bisphenols are also present.

The alkylated bisphenols may contain from 1 to 8 alkyl groups, preferably they contain from 2 to 6 alkyl groups. Alkylated bisphenols having 4 alkyl groups are particularly preferred. Each of the alkyl groups may contain from 1 to 10 carbon atoms, preferably 2 to 6 carbon atoms and especially 4 carbon atoms. Furthermore, the alkyl groups contained by any particular bisphenol may be the same or different and may also be primary, secondary or tertiary alkyl groups. Bisphenols containing at least one tertiary alkyl group are particularly preferred.

As examples of the alkylated bisphenols which may be used according to the invention there are mentioned bis(3-ethyl-4-hydroxyphenyl)disulfide,
bis(3-methyl-4-propyl-5-hydroxyphenyl)disulfide,
bis(2-isopropyl-3-butyl-5-hydroxyphenyl)selenide,
2,2'-diethyl-3-tertiarybutyl-4,4'-dihydroxydiphenyl
  selenide,
bis 1,2(2,6-di-tertiary-butyl-4-hydroxyphenyl)thiaethane,
bis 1,2(2,5-diisopropyl-3-hydroxyphenyl)thiaethane,
bis(3,5-di-tertiary-butyl-4-hydroxyphenyl)sulfide,
2,4-diisobutyl-3-hydroxybenzyl-2',4'-dipropyl-3'-hydroxy-
  benzyl sulfide,
bis 1,2(3-octyl-5-tertiary-butyl-4-hydroxyphenyl)ethane,
bis 1,1(2,6-diisopropyl-4-hydroxyphenyl)ethane,
1,2-bis(2,4-ditertiary pentyl-3-hydroxyphenyl)propane,
bis 2,2(4,5ditertiary butyl-2-hydroxyphenyl)propane,
bis(2-tertiary-butyl-5-isopentyl-4-hydroxyphenyl)amine,
bis(3,5-dibutyl-4-hydroxyphenyl)ether,
bis(2,6-dipropyl-4-hydroxyphenyl)ether.

Preferred compound are the alkylated bisphenols having a sulfur or methylene bridge; the former include bis(2,5-dipentyl-4-hydroxyphenyl)sulfide,
bis(2,5-dihexyl-3-hydroxyphenyl)sulfide,
bis(2-methyl-5-tertiary-butyl-4-hydroxyphenyl)sulfide,
bis(2-methyl-5-tertiary-butyl-6-hydroxyphenyl)sulfide and,
  particularly,
bis(3-tertiary-butyl-5-methyl-2-hydroxyphenyl)sulfide, and examples of the latter, namely, alkylated bisphenols having a methylene bridge, include bis(2,3-di-tertiary-butyl-4-hydroxyphenyl)methane,
bis(2,5-di-tertiary-butyl-4-hydroxyphenyl)methane,
bis(2,6-di-tertiary-butyl-4-hydroxy-phenyl)methane,
bis(3,5-di-tertiary-octyl-4-hydroxyphenyl)methane,
bis(3-tertiary-butyl-5-tertiary-octyl-4-hydroxyphenyl)-
  methane, and especially,
bis(3,5-di-tertiary-butyl-4-hydroxyphenyl)methane.

Also, the sulfoxy phosphono additive alone or in combination with a bisphenol appears to coact to give additional unexpected improvement in anti-wear and anti-scuffing.

Minor amounts of each class of additives are sufficient for a highly effective combination. The sulfoxyphosphono compound may be used in an amount of about 0.1–10% preferably about 0.2–5% by weight, with about 0.05–2%, preferably about 0.1–1%, if desired of the methylene bisphenol or sulfide derivative thereof.

The additive of the present invention may be used to improve various hydrocarbon lubricating oils, whether of natural origin or synthetic, especially oils which are substantially paraffinic and/or naphthenic; they may contain substantial proportions of hydrocarbons having aromatic character but the amount and types of components should be such the Dean and Davis (chem, and Met. Eng., vol. 36, 1929, pp. 618–619) viscosity index of the base oil is at least 80, preferably at least 90 to 150.

The oil may be derived from a highly paraffinic crude, in which case distillation and/or dewaxing may be sufficient to provide a suitable base stock; a minimum of chemical or selective solvent treatment may be used if desired. Mixed-base crudes and even highly aromatic crudes which contain paraffinic hydrocarbon also provide suitable oil base stock by well known refining techniques. Usually these comprise the separation of distillate fractions of suitable boiling range followed by selective solvent extraction with solvents such as furfural, phenol and the like to provide raffinate fractions which are suitable for further refining by dewaxing or chemical treatment such as sulfuric acid treatment, etc. Thus, it may be a refined hydrocarbon oil obtained from a paraffinic, naphthenic, asphaltic or mixed-base crude, and/or mixtures thereof, such as SAE 5W, 10W, 20W, 20, 30, 40 50 mineral oils. The hydrocarbon oils may be blends of different mineral oil distillates and bright stock; they may have blended therewith in minor but compatible proportions fixed oils, such as castor oil, lard oil and the like and/or with synthetic lubricants, such as polymerized olefins, e.g. polyisobutylene.

The following compositions are representative of the invention:

Composition A:
   Example (IA) additive _____ 2%
   1010 Mineral oil _____ Balance
Composition B:
   Example (IIA) additive _____ 2%
   1010 Mineral oil _____ Balance
Composition C:
   Example (IIIA) additive _____ 2%
   1010 Mineral oil _____ Balance
Composition D:
   Example (IA) additive _____ 2%
   Bis(3,5 - di-tert butyl - 4-hydroxyphenyl) methane _____ 0.5%
   1010 Mineroil oil _____ Balance
Composition E:
   Example (IIA) additive _____ 1%
   SAE 30 Mineral oil _____ Balance
Composition F:
   Example (IA) additive _____ 2%
   SAE 90 Mineral oil _____ Balance
Composition G:
   Example (IA) additive _____ 2%
   Bis(3,5 - di-tert butyl - 4 - hydroxyphenyl) methane _____ 0.5%
   SAE 90 Mineral oil _____ Balance
Composition H:
   Example (IA) additive _____ 5%
   Ucon 50HB660 (polyethylene-propylene glycol having an SUS viscosity at 100° F. of 660) _____ Balance
Composition I:
   Example (IIA) additive _____ 2%
   Di-2-ethylhexyl sebacate _____ Balance
Composition J:
   Example (IA) additive _____ 1%
   Leaded gasoline (3 cc. of TEL) _____ Balance
Composition K:
   Example (IA) additive _____ 0.1%
   Fuel oil (No. 2) _____ Balance Compositions of this invention were evaluated for their extreme pressure properties on a spur-gear machine. The machine consists essentially of two geometrically similar parts of gears connected by two parallel shafts. The gear pairs are placed in separate gear boxes, which also contain the supporting ball bearings. One of the shafts consists of two sections connected by a coupling. Loading is accomplished by locking one side of the coupling and applying torque to the other. The conditions of the test were:

Speed _____ r.p.m __ 3200
Oil temperature _____ ° C __ 100
Oil flow-rate _____ cc./sec __ 10
Load in increments; 5 min. at each setting.

Results of the evaluations are given in Table I and, for purpose of comparison, the results obtained from the use of the base oil alone and with other known extreme pressure compositions are also given.

TABLE I

| Composition: | Score load, lbs./in. |
|---|---|
| A through I | 6400 |
| 1010 Mineral oil+2% $C_{16}$ alkenyl succinic acid | 1400 |
| 1010 Mineral oil+2% malonic acid | 2800 |
| 1010 Mineral oil+2% 3-hexadecyladipic acid | 1400 |
| 1010 Mineral oil+2% dodecylmercapto succinic acid | 1400 |
| 1010 Mineral oil+10% glycerol monooleate | 1800 |
| 1010 Mineral oil+2% $C_{13}H_{27}OH$ ("OXO" process) | 600 |
| 1010 Mineral oil | 600 |

The following compositions were also tested for stability in the Dornte Oxidation Test described in the Natural Petroleum News, September 17, 1941, pages 294–6 under the following conditions: 302° F., iron catalyst, mineral white oil base; additive amount by weight in each example and the results are shown in Table II.

TABLE II

| Additive | Induction Period (Hrs.) |
|---|---|
| (1) 0.72% Example IA additive $C_{10}SOCH_2\overset{O}{\overset{\uparrow}{P}}(OH)_2$ | 69 |
| (2) 0.4% Example IIA additive $C_{10}SOCH_2\overset{O}{\overset{\uparrow}{P}}\diagdown\!\!\!\diagup\begin{smallmatrix}OH\\OC_4H_9\end{smallmatrix}$ | 42 |
| (3) 0.4% bis(3,5-di-tert-butyl-4-hydroxyphenyl)methane | 14 |
| (4) 0.2% Example IA+.2% bis(3,5-di-tert-butyl-4-hydroxyphenyl)methane | 141 |
| (5) 0.4% monobutyl decylsulfonylmethylphosphonate $C_{10}SO_2CH_2\overset{O}{\overset{\uparrow}{P}}\diagdown\!\!\!\diagup\begin{smallmatrix}OH\\OC_4H_9\end{smallmatrix}$ | 0.05 |
| (6) 0.33% decylsulfonylmethylphosphonic acid $C_{10}SO_2CH_2\overset{O}{\overset{\uparrow}{P}}(OH)_2$ | 0.8 |

Compositions of this invention are particularly applicable for high-temperature high-speed use as in aviation engines, automotive engines and truck engines, as well as industrial equipment operating under the conditions described in this invention.

Compositions of the present invention such as additives IA, IIA, IIIA, etc. may be used per se or in suitable diluents such as water, emulsions, mineral oils, etc. for use as insecticidal and herbicidal agents.

We claim as our invention:
1. A compound having the formula:

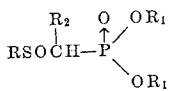

wherein R is a $C_{2-18}$ alkyl radical, the $R_1$'s are selected from the group consisting of hydrogen, $C_{1-4}$ alkyl and alkylamine radicals and $R_2$ is selected from the group consisting of hydrogen and a $C_{1-4}$ alkyl radical.

2. The compound of claim 1 where R is a $C_{2-18}$ alkyl radical, $R_2$ and the $R_1$'s are hydrogen.

3. The compound of claim 1 wherein R is a $C_{2-18}$ alkyl radical, $R_2$ is hydrogen and one of the $R_1$'s is hydrogen and the other a $C_{1-4}$ alkyl radical.

4. The compound of claim 1 wherein R is a $C_{10-18}$ alkyl radical, $R_2$ is hydrogen and at least one $R_1$ is an alkylamine.

5. A $C_{10-18}$ alkyl sulfoxy methylphosphonic acid.

6. A $C_{1-4}$ alkyl ester of $C_{10-18}$ alkyl sulfoxymethylphosphonic acid.

7. A salt of $C_{10-18}$ alkyl sulfoxymethylphosphonic acid.

8. Dibutyl ester of decyl sulfoxymethylphosphonic acid.

9. Monobutyl ester of decyl sulfoxymethylphosphonic acid.

10. Alkylamine salt of decyl sulfoxymethylphosphonic acid.

No references cited.

CHARLES B. PARKER, *Primary Examiner.*

FRANK M. SIKORA, ANTON H. SUTTO,
*Assistant Examiners.*